(12) United States Patent
Coto et al.

(10) Patent No.: US 8,056,792 B2
(45) Date of Patent: Nov. 15, 2011

(54) SCALLOPED HORN

(75) Inventors: Guillermo Coto, Monroe, CT (US);
Richard R. Hansen, Branford, CT (US)

(73) Assignee: Branson Ultrasonics Corporation, Danbury, CT (US)

( * ) Notice: Subject to any disclaimer, the term of this patent is extended or adjusted under 35 U.S.C. 154(b) by 0 days.

(21) Appl. No.: 12/773,046

(22) Filed: May 4, 2010

(65) Prior Publication Data
US 2010/0282821 A1    Nov. 11, 2010

Related U.S. Application Data

(60) Provisional application No. 61/175,609, filed on May 5, 2009.

(51) Int. Cl.
*B23K 1/06* (2006.01)
*B29C 65/00* (2006.01)

(52) U.S. Cl. ........................ 228/1.1; 156/580.1

(58) Field of Classification Search ............ 228/1.1, 228/110.1; 156/73.1–73.4, 580.1, 580.2
See application file for complete search history.

(56) References Cited

U.S. PATENT DOCUMENTS

| | | | | |
|---|---|---|---|---|
| 3,148,293 | A * | 9/1964 | Jones et al. | 310/26 |
| 3,780,926 | A * | 12/1973 | Davis | 228/1.1 |
| 3,955,740 | A * | 5/1976 | Shoh | 228/1.1 |
| 4,854,494 | A * | 8/1989 | von Raben | 228/102 |
| 5,495,976 | A | 3/1996 | Mironesco et al. | |
| 5,772,100 | A * | 6/1998 | Patrikios | 228/1.1 |
| 5,976,314 | A * | 11/1999 | Sans | 156/580.1 |
| 6,070,777 | A * | 6/2000 | Patrikios et al. | 228/1.1 |
| 6,543,669 | B2 * | 4/2003 | Takahashi et al. | 228/110.1 |
| 6,575,348 | B2 * | 6/2003 | Kimura et al. | 228/1.1 |
| 6,845,897 | B2 * | 1/2005 | Nishiura | 228/1.1 |
| 7,100,812 | B2 * | 9/2006 | Zhai et al. | 228/1.1 |
| 7,392,923 | B2 * | 7/2008 | Stroh et al. | 228/1.1 |
| 7,484,650 | B2 * | 2/2009 | Szucher | 228/1.1 |
| 7,648,279 | B2 * | 1/2010 | Struziak et al. | 384/103 |
| 7,753,890 | B2 * | 7/2010 | Lafferty, IV | 604/191 |
| 7,757,926 | B2 * | 7/2010 | Chong et al. | 228/1.1 |
| 7,785,016 | B2 * | 8/2010 | Luther et al. | 385/71 |

(Continued)

FOREIGN PATENT DOCUMENTS

JP    2000340598 A  * 12/2000
(Continued)

OTHER PUBLICATIONS

Computer translation of JP 2000-340598, 2000.*
(Continued)

*Primary Examiner* — Kiley Stoner
*Assistant Examiner* — Carlos Gamino
(74) *Attorney, Agent, or Firm* — Harness, Dickey & Pierce, P.L.C.

(57) ABSTRACT

An ergonomic horn for use in an ultrasonic welder having a base structure defining a first longitudinal axis, where the base structuring is connectable to the ultrasonic welder, and a tip mounting head defining a second longitudinal axis. The second longitudinal axis is angled relative to the first longitudinal axis to permit an ergonomic positioning of the item to be welded. The tip mounting head is operable to support a removable ultrasonic welding tip member. The ergonomic horn further having a reduced thickness neck portion interconnecting the base structure and the tip mounting head, such that the base structure, tip mounting head, and reduced thickness neck portion together transmit ultrasonic energy in the range of approximately 10 kHz to approximately 60 kHz for ultrasonic welding.

14 Claims, 4 Drawing Sheets

U.S. PATENT DOCUMENTS

2009/0013786 A1 * 1/2009 Gassert .......................... 73/579
2009/0277951 A1 * 11/2009 Ebihara et al. ............. 228/110.1

FOREIGN PATENT DOCUMENTS

| JP | 2002210569 A | 7/2002 |
| JP | 2003165161 A | 6/2003 |
| JP | 2003282645 A | 10/2003 |
| WO | WO 2005116593 A1 * | 12/2005 |

OTHER PUBLICATIONS

International Search Report and Written Opinion in PCT/US2010/033656 Mailed Jan. 14, 2011.

* cited by examiner

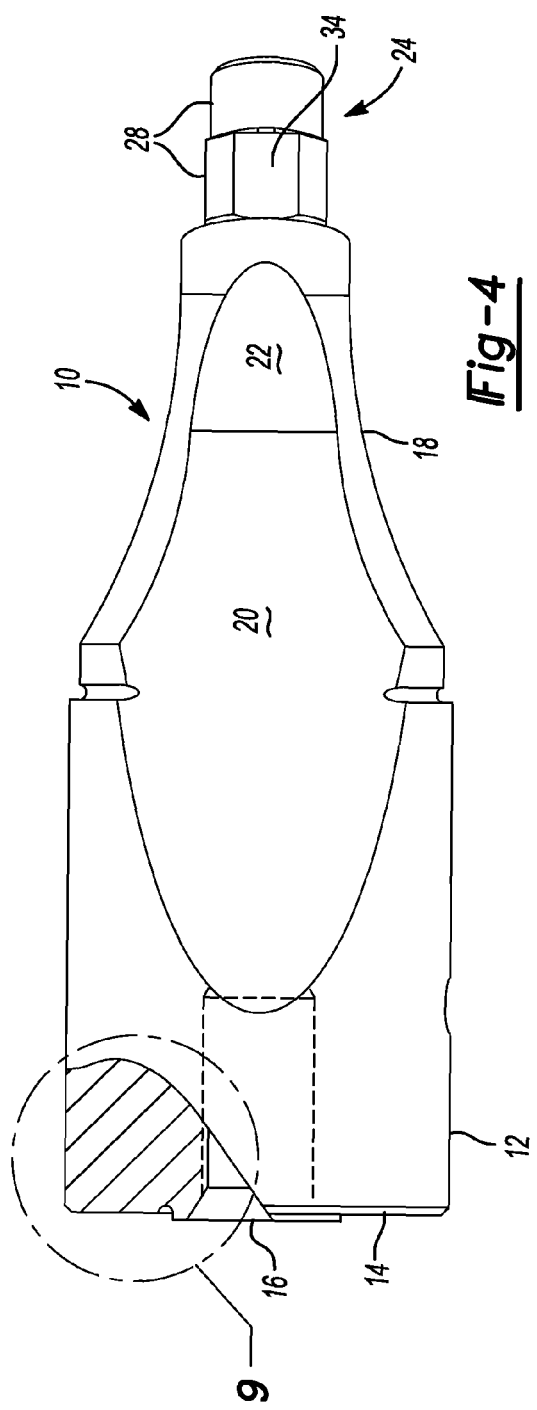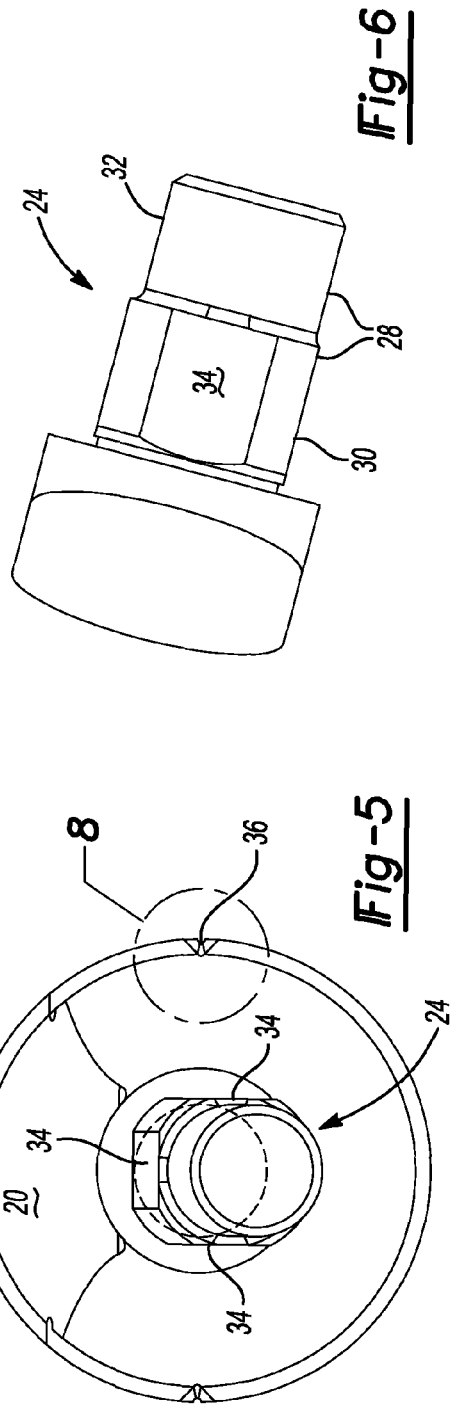

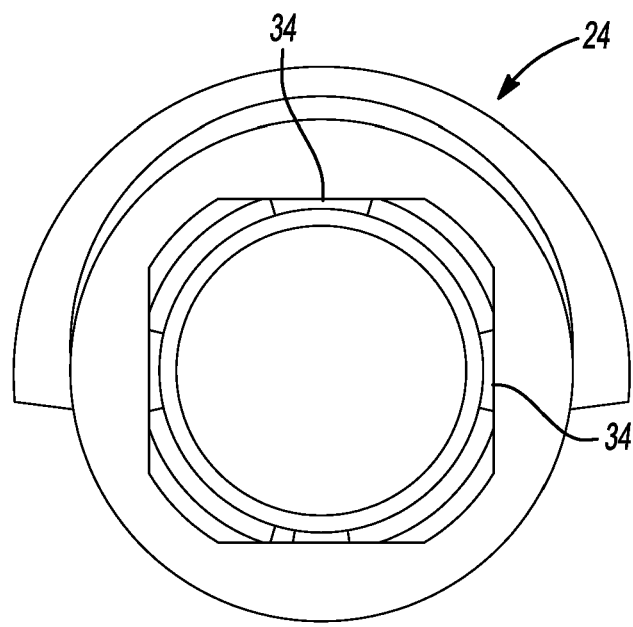
*Fig-7*
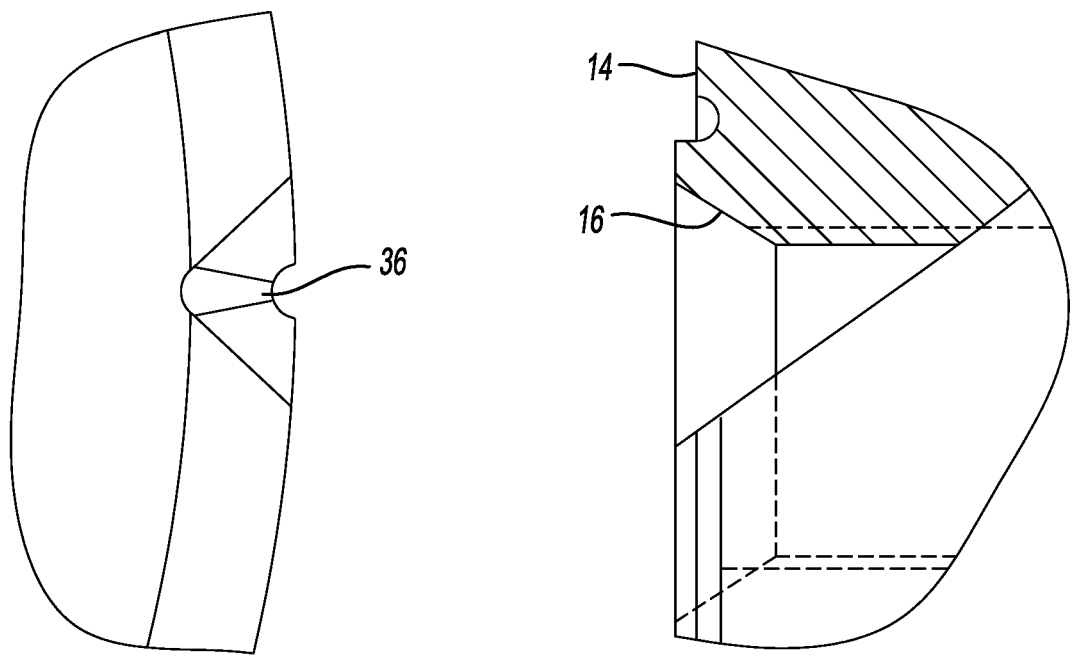
*Fig-8*
*Fig-9*

SCALLOPED HORN

CROSS-REFERENCE TO RELATED APPLICATIONS

This application claims the benefit of U.S. Provisional Application No. 61/175,609, filed on May 5, 2009. The entire disclosure of the above application is incorporated herein by reference.

FIELD

The present disclosure relates to ultrasonic welding horns and, more particularly, relates to an ergonomic ultrasonic welding horn.

BACKGROUND

This section provides background information related to the present disclosure which is not necessarily prior art.

Ultrasonic energy has been shown to be a useful tool in a wide variety of applications from very low power medical diagnostics through high intensity processes which change the state of materials. Joining of metals, specifically nonferrous metals used in electrical connections, is a particularly useful application of this technology. Commonly used techniques involving the fusion of metal through the application of heat by flame, hot tools, electric current or electric arc in combination with cleaning and fluxing agents and sometimes filler metals are able to join these materials but the characteristics of these processes and the materials to be joined are at odds with one another. Still, users have become accustomed to the problems associated with fusion welding to the point that the problems are considered "normal."

Ultrasonic welding of nonferrous metals in electrical connections has been demonstrated to eliminate most, if not all, of these problems. In fact, ultrasonic welding of metals is rapidly becoming the process of choice by informed design and manufacturing engineers. The number of applications and reduced operating expenses have led to wide use of ultrasonic welding for wiring and interconnection applications.

Since the first ultrasonic welding machine for metals was developed and patented in 1960, there have been significant technological advances which now make the process a practical production tool. Early power supplies, employing vacuum tube technology, could not produce high power levels of ultrasonic energy and were inefficient and expensive. Early work was limited to research and development which showed the promise of the process and spurred further technical development. Today, ultrasonic energy in general is a well established tool of industry having applications in nondestructive testing, industrial ultrasonic cleaning, ultrasonic plastic joining and ultrasonic metal welding. Ultrasonic metal welding has much to offer the user including speed, efficiency, excellent weld quality, elimination of consumables, long tool life and the ability to be automated.

Generally, ultrasonic energy is mechanical vibratory energy which operates at frequencies beyond audible sound, or 18,000 Hz (18,000 Hz being the upper threshold of the normal human hearing range). Two basic frequencies are generally used; 20,000 Hz and 40,000 Hz, depending on the application. Selection is based upon the required power levels, the amplitude of vibration required and the size of the ultrasonic tool to be used. Frequency is important because it directly affects the power available and the tool size. It is easier to generate and control high power levels at the lower frequency. Also, ultrasonic tools are resonant members whose size is inversely proportional to their operating frequency. The generation of ultrasonic energy starts with conversion of conventional 50 or 60 Hz electrical power to 20,000 or 40,000 Hz electrical energy by a solid state power supply.

SUMMARY

This section provides a general summary of the disclosure, and is not a comprehensive disclosure of its full scope or all of its features.

According to the principles of the present teachings, an ergonomic horn for use in an ultrasonic welder having an advantageous construction is provided. The ergonomic horn comprises a base structure defining a first longitudinal axis, where the base structuring is connectable to the ultrasonic welder, and a tip mounting head defining a second longitudinal axis. The second longitudinal axis is angled relative to the first longitudinal axis to permit an ergonomic positioning of the item to be welded. The tip mounting head is operable to support a removable ultrasonic welding tip member. The ergonomic horn further having a reduced thickness neck portion interconnecting the base structure and the tip mounting head, such that the base structure, tip mounting head, and reduced thickness neck portion together transmit ultrasonic energy in the range of approximately 10 kHz to approximately 60 kHz for ultrasonic welding.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a top view of the ergonomic horn;

FIG. 5 is a tip-end view of the ergonomic horn;

FIG. 6 is an enlarged side view of the tip of the ergonomic horn;

FIG. 7 is an enlarged tip-end view of the ergonomic horn;

FIG. 8 is an enlarged view of an alignment slot formed in the ergonomic horn; and FIG. 9 is a partial cross-sectional view of the ergonomic horn.

Corresponding reference numerals indicate corresponding parts throughout the several views of the drawings.

DETAILED DESCRIPTION

Example embodiments will now be described more fully with reference to the accompanying drawings.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 1:
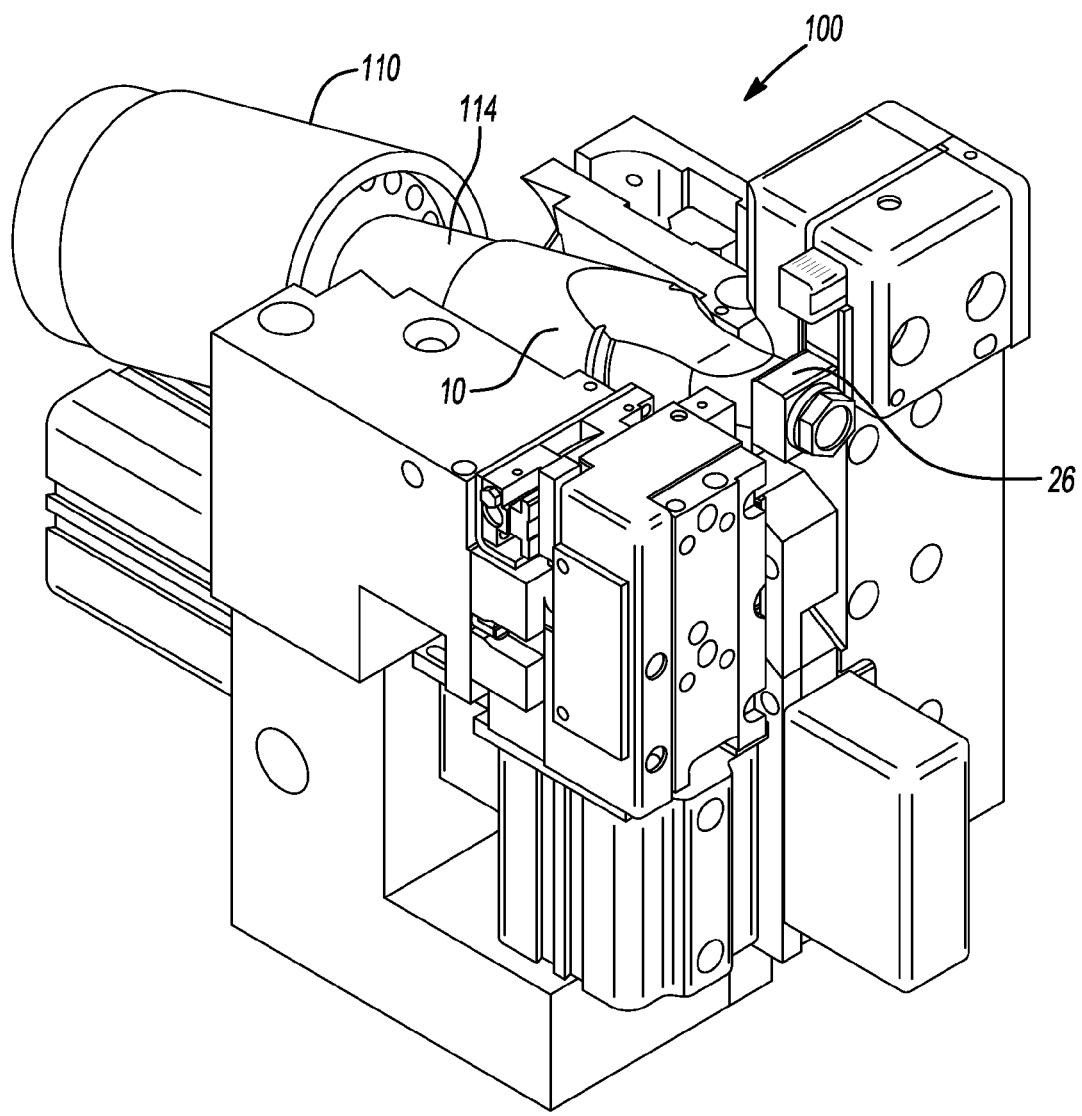
FIG. 1 is a perspective view of an ultrasonic welder having an ergonomic horn according to the principles of the present teachings.

Referring to the figures and in FIG. 1 in particular there is shown an ultrasonic half-wavelength resonator system 100 and a means for energizing the resonator system, such as an electrical generator. A half wavelength resonator is characterized by an antinodal region of longitudinal motion at both the input surface and the output surface and an intermediate nodal region of longitudinal motion. The electrical generator converts line voltage to a predetermined high frequency electrical signal. The predetermined frequency is usually in the range between one and 100 kilohertz, preferably in the range between 20 and 60 kilohertz. The electrical signal from the electrical generator is provided to an electro-acoustic converter 110 (in some embodiments, the electro-acoustic converter can be integral with the generator which converts the electrical energy applied at its input into mechanical vibratory motion of the predetermined frequency manifest at the output surface of the converter. Electro-acoustic converter 110 can be of conventional design, if desired. The converter can further be constructed in accordance with the teachings of U.S. Pat. No. 4,315,181, issued to Holze, Jr., dated Feb. 9, 1982, entitled "Ultrasonic Resonator (Horn) with Skewed Slots." While electro-acoustic converter 110 is preferably an electro-acoustic converter, a magnetostrictive converter could be used.

Still referring to FIG. 1, electro-acoustic converter 110 can then be operably coupled to a diaphragm 114, which transmits the mechanical vibratory motion from electro-acoustic converter 110 to a horn 10 via a threaded stud (not shown) for ultrasonic welding according to the principles of the present teachings. Referring to FIGS. 2-9, horn 10 is illustrated as an ergonomic horn. The ergonomic design of the horn of the present teachings offers manufacturers the fastest and cleanest method of reliably assembling components. Moreover, as will be described, the ergonomic horn 10 of the present teachings defines a shape that is conducive to safe and comfortable ultrasonic welding by an operator without the need for unhealthy contortion of the hands, wrists, or body. In some embodiments, ergonomic horn 10 is made of titanium, although other materials are anticipated.

Figure 3:
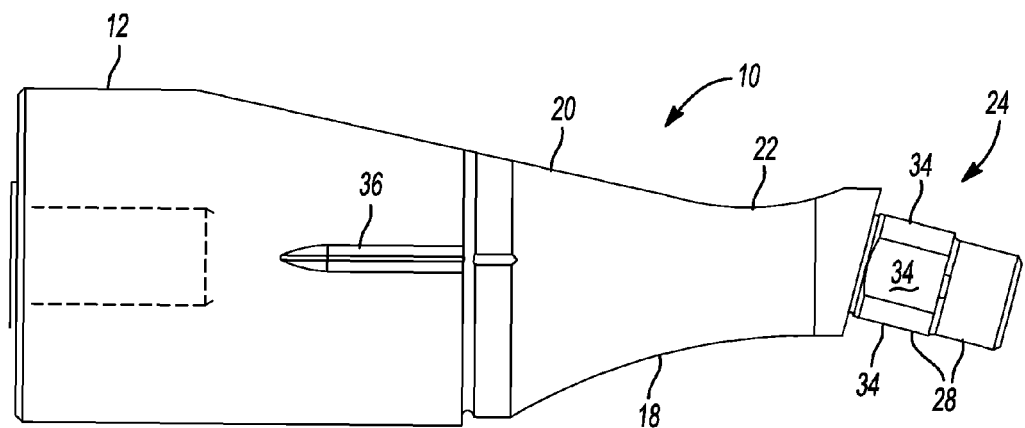
FIG. 3 is a side view of the ergonomic horn.

To this end, as seen in FIGS. 3-5, ergonomic horn 10 comprises a generally cylindrical base structure 12 terminating at a mounting face 14. In some embodiments, base structure 12 can define a diameter of about 1.720 inches. However, it should be appreciated that such dimension, including other dimensions sets forth herein, can change depending upon design variations and/or intended performance.

Mounting face 14 comprises a mounting aperture 16 (FIG. 9) threadedly formed to threadingly engage the threaded stud of converter 110 to permit transmission of mechanical vibratory energy to ergonomic horn 10. Ergonomic horn 10 can further define a neck portion 18 extending from base structure 12 generally along a longitudinal axis of ergonomic horn 10. Neck portion 18 can be arcuately shaped and, in some embodiments, can define a radius of about 3 inches.

Ergonomic horn 10 can further comprise a scalloped portion 20 extending along a portion of base structure 12 and neck portion 18. Scallop portion 20 can be used to remove material from ergonomic horn 10 to tune a predetermine response to the mechanical vibration, reduce horn mass, tailor overall device packaging, and the like. In some embodiments, scallop portion 20 can define a plane have a 12 degree slope relative to a longitudinal axis of base structure 12. A joining radius 22 can be formed between scallop portion 20 and neck portion 18. In some embodiments, joining radius 22 can be about 1.250 inches. Ergonomic horn 10 can further comprise a tip mounting head 24 extending from neck portion 18 and, in some embodiments, integrally formed therewith. Tip mounting head 24 is inclined at an angle to permit the ergonomic positioning of a tip member 26 (FIG. 1) thereon. Tip mounting head 24 extends from neck portion 18 and defines a platform 28 for positioning and supporting tip member 26.

The platform 28 includes a first section 30 and a second section 32. First section 30 is generally adjacent neck portion 18 and generally comprises a cylindrical shape. In some embodiments, first section 30 can comprise a plurality of optional orientation surfaces 34 cut therein. The plurality of optional orientation surfaces 34 can have any keyed shape or layout, such as but not limited to four generally flat surfaces cut into first section 30 (see FIG. 7). It should be appreciated that the plurality of orientation surfaces 34 can be eliminated and are thus optional.

Second section 32 can comprises a cylindrical shape having a diameter less than a diameter of the cylindrical section of first section 30. The shape of tip mounting head 24 can be sized to closely conform to an interior profile of tip member 26 to create a simple and reliable coupling interface. In some embodiments, tip mounting head 24 is angled between about 8 and about 23 degrees relative to a longitudinal axis of base structure 12 to provide the proper orientation and ergonomic positioning of tip member 26 during operation. This angle also serves to provide a reliable orientation capable of transmitting ultrasonic energy efficiently and reliably without damage or interference.

Moreover, in some embodiments, tip member 26 can be made of steel and be removably coupled with tip mounting head 24 of ergonomic horn 10 through any conventional fastening system, such as a threaded stud, friction fit, interference fit, and the like. To achieve the proper coupling of tip member 26 to tip mounting head 24 to permit proper ultrasonic welding, tip member 26 is torqued to about 70-90 ft/lbs. This setting has been found to achieve the desired joining connection of tip member 26 to tip mounting head 24.

Figure 2:
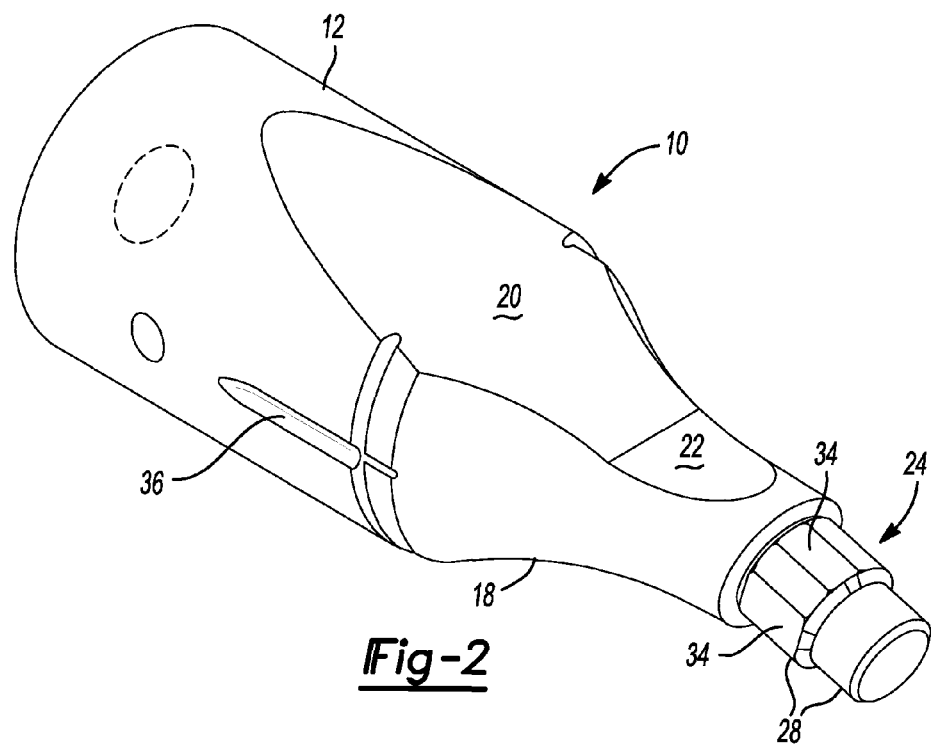
FIG. 2 is a perspective view of the ergonomic horn of the present teachings.

As best seen in FIGS. 2, 3, and 8, to achieve the proper orientation of ergonomic horn 10 relative to an operator, it may be desirable to ensure that ergonomic horn 10 is rotated to a predetermined position. To this end, a key slot 36 is longitudinally formed in base structure 12 of ergonomic horn 10. Key slot 36 can be positioned at any position relative to a set screw or other fixed orientation member (not shown) in resonator system 100. The set screw can be sized to be positively received within key slot 36 to achieve the predetermined position. In some embodiments, as seen in FIG. 8, key slot 36 is an angled cutout.

Conventional horns are generally symmetrical about a longitudinal axis and, thus, the forces exerted on the horn are generally easily modeled. However, because of the particular shape of ergonomic horn 10, forces exerted during the ultrasonic welding process can be concentrated in some areas while excess mass in other may not afford much benefit. Therefore, the shape of the present ergonomic horn has been determined through finite analysis to provide the desired structural integrity while simultaneously minimizing mass.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. An ultrasonic welder comprising:
   an electro-acoustic converter converting an electrical signal into a mechanical vibratory motion;
   a diaphragm operably coupled to said electro-acoustic converter for transmitting said mechanical vibratory motion;
   a half-wave horn operably coupled to said diaphragm to receive said mechanical vibratory motion and transmit said mechanical vibratory motion to a removable tip member, said horn having:
      a base structure including a first longitudinal axis, said base structure being coupled to said diaphragm, said base structure having a reduced thickness neck portion at a distal end of said base structure, said reduced thickness neck portion being contoured with a radius extending about said base structure and coaxial with said first longitudinal axis;
      a tip mounting head including a second longitudinal axis, said tip mounting head being mounted directly to said base structure adjacent said reduced thickness neck portion, said second longitudinal axis being inclined relative to said first longitudinal axis, said tip mounting head supporting said removable tip member; and
   a scallop portion consisting of a single plane extending along at least a portion of said base structure and said reduced thickness neck portion and interrupting said base structure and said reduced neck portion thereby resulting in an asymmetrical shape of said reduced thickness neck portion,
   said base structure, tip mounting head, and reduced thickness neck portion together transmit said mechanical vibratory motion at a frequency in the range of approximately 10 kHz to approximately 60 kHz.

2. The ultrasonic welder according to claim 1 wherein said scallop portion extends along at least a portion of said base structure and said reduced thickness neck portion.

3. The ultrasonic welder according to claim 1 wherein said first longitudinal axis is at an angle of about 8 degrees to about 23 degrees relative to said second longitudinal axis.

4. The ultrasonic welder according to claim 1, further comprising:
   a key slot formed in at least one of said base structure and said reduced thickness neck portion, said key slot being engagable with a key to maintain a predetermined orientation of the horn.

5. The ultrasonic welder according to claim 1 wherein said tip mounting head comprises:
   a platform having a first section and a second section, said second section has a diameter less than said first section.

6. The ultrasonic welder according to claim 5, further comprising:
   a plurality of orientation surfaces disposed on at least said first section of said platform.

7. The ultrasonic welder according to claim 1 wherein said plane is inclined 12 degrees relative to said first longitudinal axis.

8. A horn for use in an ultrasonic welder, said horn comprising:
   a base structure including a first longitudinal axis, said base structure being connectable to the ultrasonic welder, said base structure having a reduced thickness neck portion at a distal end of said base structure, said reduced thickness neck portion being contoured with a radius extending about said base structure and coaxial with said first longitudinal axis;
   a removable ultrasonic welding tip member;
   a tip mounting head consisting of a single a second longitudinal axis, said tip mounting head being mounted directly to said base structure adjacent said reduced thickness neck portion, said second longitudinal axis being inclined relative to said first longitudinal axis, said tip mounting head supporting said removable ultrasonic welding tip member; and
   a scallop portion including a plane extending along at least a portion of said base structure and said reduced thickness neck portion and interrupting said base structure and said reduced neck portion thereby resulting in an asymmetrical shape of said reduced thickness neck portion;
   wherein said base structure, tip mounting head, and reduced thickness neck portion together transmit ultrasonic energy in the range of approximately 10 kHz to approximately 60 kHz and define a half-wave horn.

9. The horn according to claim 8 wherein said scallop portion extends along at least a portion of said base structure and said reduced thickness neck portion.

10. The horn according to claim 8 wherein said first longitudinal axis is at an angle of about 8 degrees to about 23 degrees relative to said second longitudinal axis.

11. The horn according to claim 8, further comprising:
    a key slot formed in at least one of said base structure and said reduced thickness neck portion, said key slot being engagable with a key to maintain a predetermined orientation of the horn.

12. The horn according to claim 8 wherein said tip mounting head comprises:
    a platform having a first section and a second section, said second section has a diameter less than said first section.

13. The horn according to claim 12, further comprising:
    a plurality of orientation surfaces disposed on at least said first section of said platform.

14. The horn according to claim 8 wherein said plane is inclined 12 degrees relative to said first longitudinal axis.

* * * * *

UNITED STATES PATENT AND TRADEMARK OFFICE
CERTIFICATE OF CORRECTION

PATENT NO. : 8,056,792 B2  
APPLICATION NO. : 12/773046  
DATED : May 4, 2010  
INVENTOR(S) : Guillermo Coto et al.

Page 1 of 1

It is certified that error appears in the above-identified patent and that said Letters Patent is hereby corrected as shown below:

Column 3,
Line 45, after "generator", insert --)--.

Column 6,
Line 29, claim 8 after "single", delete "a".

Signed and Sealed this
Thirteenth Day of March, 2012

David J. Kappos
*Director of the United States Patent and Trademark Office*